United States Patent
Ohmori et al.

(10) Patent No.: US 8,687,758 B2
(45) Date of Patent: Apr. 1, 2014

(54) METHOD FOR MANAGING INTERNAL EQUIPMENT IN REACTOR PRESSURE VESSEL AND APPARATUS THEREOF

(75) Inventors: Shinya Ohmori, Mito (JP); Koichi Kurosawa, Hitachi (JP); Sadashi Ootomo, Kitaibaraki (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 722 days.

(21) Appl. No.: 12/858,865

(22) Filed: Aug. 18, 2010

(65) Prior Publication Data

US 2011/0051878 A1 Mar. 3, 2011

(30) Foreign Application Priority Data

Aug. 31, 2009 (JP) ................................ 2009-199199

(51) Int. Cl.
*G21D 1/00* (2006.01)
*G21D 1/04* (2006.01)

(52) U.S. Cl.
CPC ...................................... *G21D 1/04* (2013.01)
USPC ........................................................ 376/260

(58) Field of Classification Search
USPC .................... 376/277; 219/72, 617
See application file for complete search history.

(56) References Cited

U.S. PATENT DOCUMENTS

| | | | |
|---|---|---|---|
| 5,852,271 A | 12/1998 | Offer | |
| 7,753,993 B2 * | 7/2010 | Schottler et al. | 95/266 |
| 7,754,993 B2 * | 7/2010 | Ortega | 219/72 |
| 2005/0269383 A1 * | 12/2005 | Ortega et al. | 228/101 |
| 2007/0121776 A1 * | 5/2007 | Pao | 376/305 |
| 2008/0099446 A1 * | 5/2008 | Belanger | 219/121.14 |

FOREIGN PATENT DOCUMENTS

| | | | |
|---|---|---|---|
| JP | 02-147896 | * | 6/1990 |
| JP | 2-147896 A | | 6/1990 |
| JP | 5-80186 A | * | 4/1993 |
| JP | 5-312992 A | * | 11/1993 |
| JP | 7-318681 A | * | 12/1995 |
| JP | 08-075892 | * | 3/1996 |
| JP | 8-75892 A | | 3/1996 |
| JP | 9-1347 A | * | 1/1997 |
| JP | 10-034325 | * | 2/1998 |

(Continued)

OTHER PUBLICATIONS

Japanese Office Action with English translation dated Aug. 7, 2012 (six (6) sheets).

(Continued)

*Primary Examiner* — Jack W Keith
*Assistant Examiner* — Sean P Burke
(74) *Attorney, Agent, or Firm* — Crowell & Moring LLP

(57) ABSTRACT

A access apparatus is set on instrumentation nozzles penetrating a bottom portion of a reactor pressure vessel, in the reactor pressure vessel filling water. The access apparatus has an arm turned, and a mounting fixture that can move along the arm and having a holding member. A cover apparatus having a guide pipe covers the access apparatus, and is installed on the bottom portion in underwater environment in the reactor pressure vessel. The water below the cover apparatus is drained from the reactor pressure vessel to form an air space below the cover apparatus. A variety of device heads is suspended and lowered in the air space through the guide pipe, and mounted to the holding member of the mounting fixture. Repair or preventive maintenance operation against the instrumentation nozzles is performed by the variety of device heads.

15 Claims, 16 Drawing Sheets

(56) References Cited

FOREIGN PATENT DOCUMENTS

| | | | |
|---|---|---|---|
| JP | 10-34325 | | 2/1998 |
| JP | 11-295475 | * | 10/1999 |
| JP | 11-295475 A | | 10/1999 |
| JP | 2000-056070 | * | 2/2000 |
| JP | 2000-56070 A | | 2/2000 |
| JP | 2001-108784 A | * | 4/2001 |
| JP | 2005-297090 A | * | 10/2005 |
| JP | 2008-020447 | * | 1/2008 |
| JP | 2008-20447 A | | 1/2008 |
| JP | 2008-188650 | * | 8/2008 |
| JP | 2008-188650 A | | 8/2008 |

OTHER PUBLICATIONS

"Report about Safety Evaluation of an Important Structure (Nuclear Plant Preservation Technology Reliability Demonstration Project (Equipment Preservation))" with partial English translation, Incorporated foundation, Nuclear Power Engineering Corporation, Mar. 2002, pp. 1-41 (forty-two (42) sheets).

Japanese Office Action including English translation dated Oct. 25, 2011 (Eight (8) pages).

* cited by examiner

METHOD FOR MANAGING INTERNAL EQUIPMENT IN REACTOR PRESSURE VESSEL AND APPARATUS THEREOF

CLAIM OF PRIORITY

The present application claims priority from Japanese Patent application serial no. 2009-199199, filed on Aug. 31, 2009, the content of which is hereby incorporated by reference into this application.

BACKGROUND OF THE INVENTION

1. Technical Field

The present invention relates to method for managing internal equipment in a reactor pressure vessel during operation of a nuclear power plant.

2. Background Art

Internal equipments grouped close together such as instrumentation nozzles mounted to the bottom portion of a reactor pressure vessel, penetrating a bottom head of the reactor pressure vessel, are joined to the bottom head by welding. Methods for carrying out preventive maintenance or repair of these welds have been conventionally performed in an underwater environment, so the applicable methods have been limited to methods performable in water, methods in which a region around a target is defined and locally made into an air environment, or methods in which cooling water in the reactor pressure vessel is drained from the reactor pressure vessel to make the entire vessel an air environment.

One method for preventive maintenance is, in terms of a material factor that is one of the causes for stress corrosion cracking, a method for reforming surface of structure member by weld-overlay using a corrosion-resistant welding material. One method for repair is repair welding after a crack is removed from structure member (for example, the reactor pressure vessel) composing a reactor by grinding. Thus, it is preferable that welding can be performed to the structure member in both the preventive maintenance and repair, and in order to perform welding in a reactor pressure vessel boundary, all procedures including pre-weld polishing, welding, after-weld polishing, weld size measurement, and penetrant testing (PT) are required to be performed in the given environment, all of which have been previously performed in air.

A plurality of prior arts disclosed a method applicable in water, such as using an underwater welding apparatus and a polishing/grinding apparatus, can be found. For example, Japanese Patent Laid-open No. Hei 9 (1997)-1347 discloses an underwater TIG welding apparatus that dome-forming gas is injected toward the tip of a TIG welding torch to eliminate water around a welding surface. Furthermore, in an underwater polishing apparatus disclosed in Japanese Patent Laid-open No. 2005-297090, a apparatus having a disc grinder for grinding/polishing and a hood cover is proposed; and there is a method individually combining the disc grinder and the hood cover.

As a method of limiting a target region and locally making an air environment surrounding the target region, a method using a cover apparatus for repairing a housing penetrating a pressure vessel (Japanese Patent Laid-open No. Hei 7 (1995)-318681), for example, has been proposed. In this method, a tubular sealing pipe surrounding a housing penetrating a reactor pressure vessel is provided to form a partial air space around the single housing penetrating the reactor pressure vessel.

As an example of a method for draining cooling water from a reactor pressure vessel to make entire inner region of the reactor pressure vessel into an air environment, a method for replacing an incore monitor housing and a apparatus used therefor has been proposed by Japanese Patent Laid-open No. 2001-108784. In this replacement method, since in a boiling water reactor (BWR), a shielding effect of cooling water cannot be obtained when the cooling water is drained from the reactor pressure vessel, causing radiation equivalent rate on an operation floor to rise, a thick shielding body is installed to a flange surface of the reactor pressure vessel and covers the reactor pressure vessel to drain the cooling water and thus replacement of an incore monitor housing can be performed in an air environment in the reactor pressure vessel.

In Japanese Patent Laid-open No. Hei 5 (1993)-312992, as in Japanese Patent Laid-open No. 2001-108784, a method has been proposed in which, after cooling water is drained below an operation target in a reactor pressure vessel, a chamber body is set and fixed using a flange surface of a top end of a core shroud disposed in the reactor pressure vessel and a lug, then a sealing plug is installed to a nozzle portion located in the upper portion of a jet pump disposed inside the reactor pressure vessel to prevent a flow of the cooling water into the lower portion of the reactor pressure vessel, so that various heads can be inserted in the lower portion of the reactor pressure vessel for preventive maintenance and repair work.

PRIOR ART LITERATURES

Patent Literatures

Patent Literature 1: Japanese Patent Laid-open No. Hei 9 (1997)-1347
Patent Literature 2: Japanese Patent Laid-open No. 2005-297090
Patent Literature 3: Japanese Patent Laid-open No. Hei 7 (1995)-318681
Patent Literature 4: Japanese Patent Laid-open No. 2001-108784
Patent Literature 5: Japanese Patent Laid-open No. Hei 5 (1993)-312992

SUMMARY OF THE INVENTION

Problem for Solving by the Invention

In a method for managing internal equipment in a reactor pressure vessel in an underwater environment, when an underwater welding apparatus and an underwater polishing apparatus are individually combined, a series of operations including pre-weld polishing, welding, after-weld polishing, weld size measurement, and penetrant testing (PT) are required to be successfully performed. However, at present, a technology of underwater penetrant testing (PT) has not been established yet.

In the covering unit for repairing the housing penetrating the reactor pressure vessel (Japanese Patent Laid-open No. Hei 7 (1995)-318681) being the method of limiting the target region and locally making the air environment surrounding the target region, when welding for preventive maintenance is performed to numerous welds of the housing penetrating the reactor pressure vessel, the sealing pipe must be moved every time a target location of the welding is changed, resulting in low workability. In the welding in particular, the sealing pipe cannot be removed until the above-mentioned series of operations including pre-weld polishing, welding, after-weld polishing, weld size measurement, and penetrant testing (PT) are completed for each target, which makes the process inefficient.

With regard to cooling water drainage from a reactor pressure vessel, in a boiling water reactor (BWR), a thick shielding body must be installed and a vast amount of the cooling water in the reactor pressure vessel must be drained and disposed as radioactive waste.

An object of the present invention is to provide a method for managing internal equipment in a reactor pressure vessel and an apparatus thereof by which the series of managing operations (for example, polishing, welding, after-weld polishing, weld size measurement, and penetrant testing [PT]) for internal equipments in a bottom portion of a reactor pressure vessel can be performed even in an underwater environment.

Means for Solving the Problem

The object of the present invention can be achieved by installing a cover apparatus for covering a plurality of internal equipments disposed in a lower region of a reactor pressure vessel, on an inner surface of a bottom portion of the reactor pressure vessel; draining water existing below the cover apparatus from the reactor pressure vessel in state that water exists above the cover apparatus in the reactor pressure vessel; and managing the internal equipments and the bottom portion being below the cover apparatus after the water drainage.

Advantageous Effect of the Invention

According to the present invention, water removal from the entire reactor can be eliminated, and management of internal equipments and a bottom portion of a reactor pressure vessel can be performed efficiently and in a relatively short operation period.

DETAILED DESCRIPTION OF THE PREFERRED EMBODIMENTS

Various embodiments of the present invention are explained below with reference to the figures.

[Embodiment 1]

In the present invention, management of internal equipment means repair and preventive maintenance operation on the equipment. A bottom portion of a reactor pressure vessel is called a bottom head. Although the present embodiment shows an example of covering, at once, all the internal equipments (for example, instrumentation nozzles mounted to the bottom head 2) disposed in a bottom region of the reactor pressure vessel as a best method, not all of the internal equipments necessarily need to be covered by a cover apparatus, but only a half or a quarter of all may be covered as well. The bottom region of the reactor pressure vessel is a region formed below a core support member 4 (FIG. 1A) fixed on an inner surface of the reactor pressure vessel.

Figure 1A:
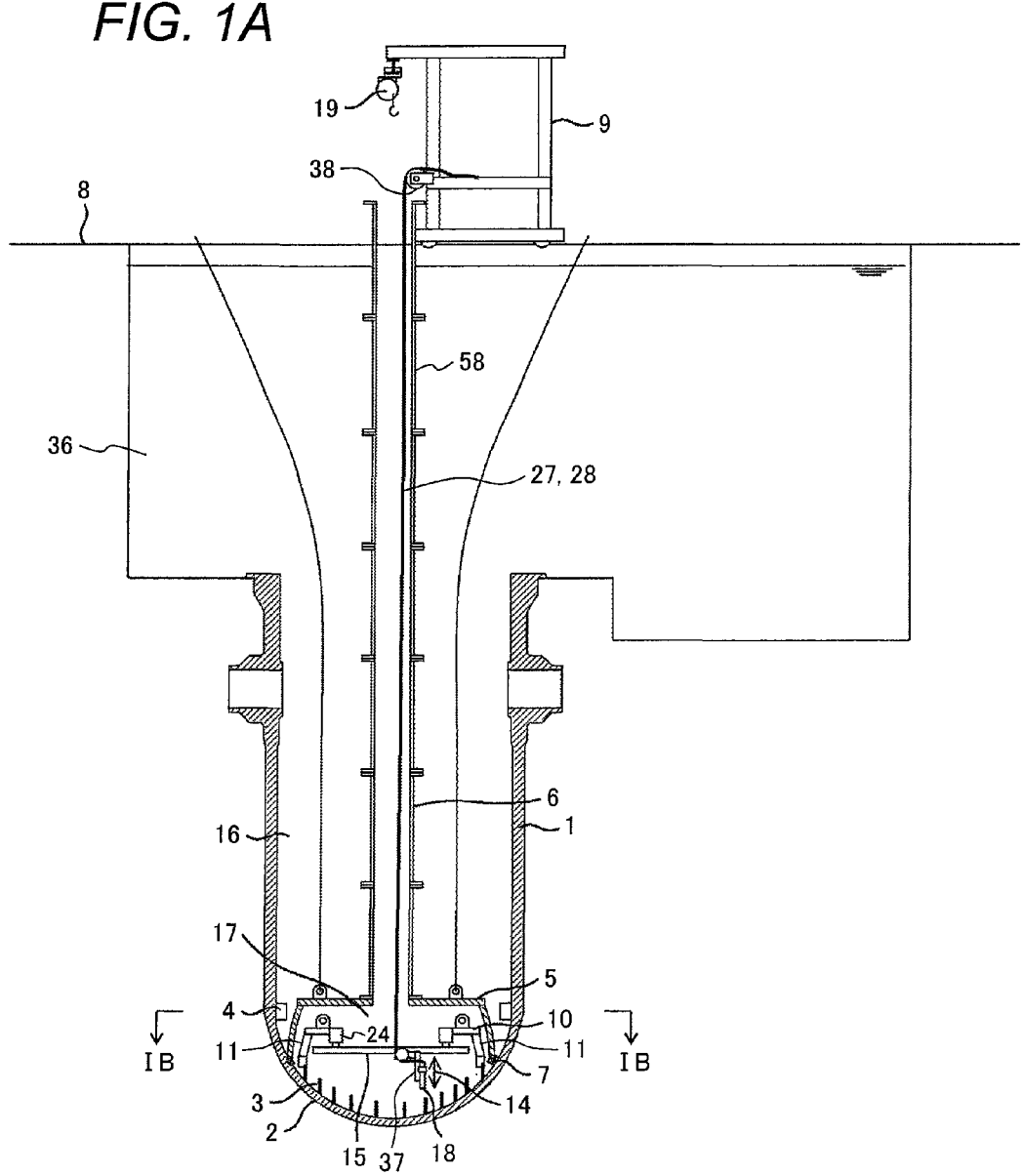
FIG. 1A is an explanatory drawing showing a method for managing internal equipment in a reactor pressure vessel according to Embodiment 1 which is a preferred embodiment of the present invention, applied to a pressurized water reactor plant, and a construction of a management apparatus used in the method for managing the internal equipment.
Figure 1B:
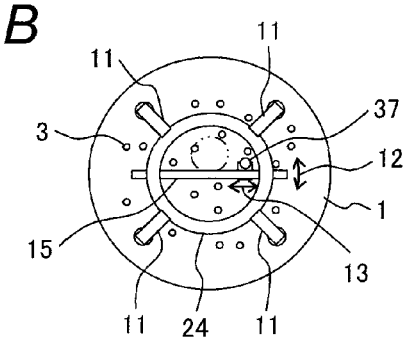
FIG. 1B is a sectional view taken along a line IB-IB of FIG. 1A.

FIGS. 1A and 1B show one embodiment with respect to internal equipments (for example, instrumentation nozzles 3) disposed in a pressurized water reactor (PWR).

The pressurized water reactor has a close grouping of instrumentation nozzles 3 penetrating a bottom head 2 inside a reactor pressure vessel 1 made of low-alloy steel lined with stainless-steel, and has core support member 4 fixed on the inner surface of the reactor pressure vessel 1, as shown in FIG. 1A. Unlike boiling water reactors (BWRs), a reactor internal of the pressurized water reactor can be separated into an upper reactor internal and a lower reactor internal for temporary storage in a cavity, substantially reducing spatial restriction during operation. Although the pressurized water reactor allows the reactor internals to be temporarily stored in the cavity, cavity water cannot be drained from the cavity because no divider exists on the reactor side.

When no crack is found on a weld of the instrumentation nozzle 3 penetrating the bottom head 2, preventive maintenance is performed by weld-overlay with a highly corrosive-resistant welding material to reform an outer surface (a wetted surface) of the weld of the instrumentation nozzle 3 as a method of improving the material, which could be one cause of stress corrosion cracking. When a crack is found in the instrumentation nozzle 3 mounted to the bottom head 2, the cracked surface is overlaid by repair welding and shielded from the surrounding to prevent the crack from spreading further, or the crack is removed by grinding, then back-filled by welding if the depth of the grinding creates a concern for strength of the structure member. Since these measures require welding, the space around the instrumentation nozzle 3 is made into an air space 17 by the following procedure.

An managing apparatus of a bottom portion of a reactor pressure vessel has a cover apparatus 5 and a common access apparatus 10 (FIG. 1A).

Figure 12A:
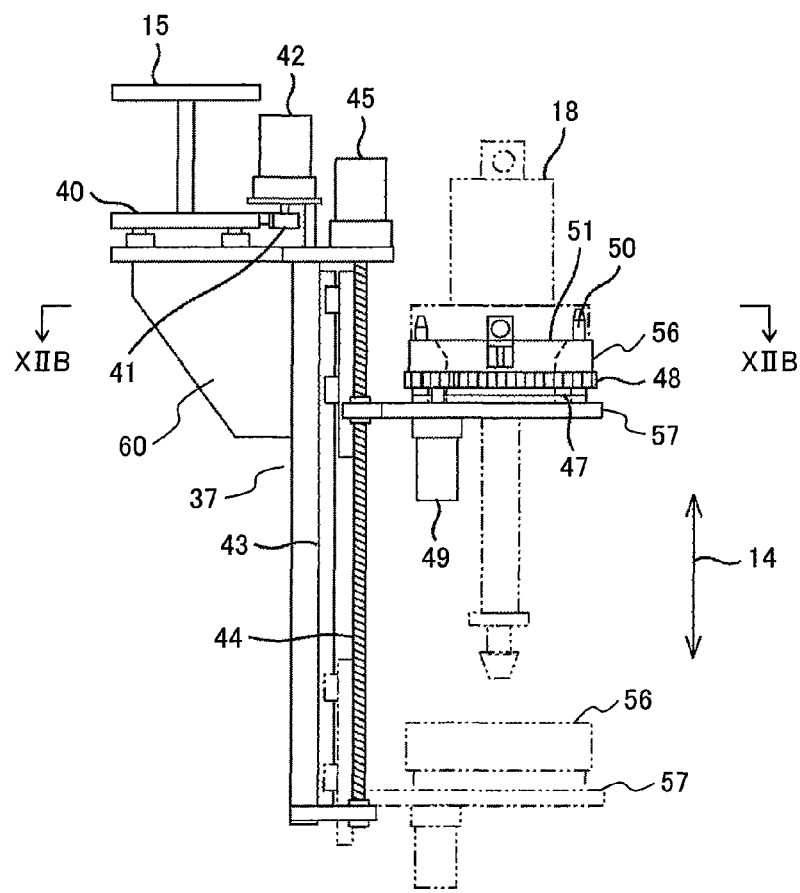
FIG. 12A is a detail structural diagram showing a mounting fixture for supporting a variety of device heads.

The cover apparatus 5, to a top surface of which a guide pipe 6 is connected, is installed on the inner surface of the bottom head 2 of the reactor pressure vessel 1 in an underwater environment 16. At this time, the reactor pressure vessel is filled with the cooling water (reactor water). The cover apparatus 5 has a sealing member 7 all around its outer circumference contacting with the inner surface of the bottom head 2 to prevent the reactor water from entering. The guide pipe 6 is dividable into a plurality of tubular pieces 58 in the axial direction, and each tubular piece 58 is connected as the cover apparatus 5 is suspended and lowered to the bottom of the reactor pressure vessel 1. The connecting operation of the pieces is performed using an operation carriage 9 that is movable on an operation floor 8. Prior to this, the common access apparatus 10 is disposed in an inside space below the cover apparatus 5 and set up on the inner surface of the bottom head 2 before the cover apparatus 5 is installed on the inner surface of the bottom head 2. The common access apparatus 10 has a plurality of legs 11, an annular support member 24 attached to each upper portion of the legs 11, an arm 15, and a mounting fixture 37. The common access apparatus 10 grasps the instrumentation nozzles 3 using the plurality of legs 11 to fix the apparatus itself in the underwater environment 16. The arm 15 is attached to the annular support member 24, and can move along the annular support member 24 in a circular movement 12. The mounting fixture 37 is attached to the arm 15, and can move along the arm 15 in a radial movement 13. A vertical movement 14 is performed by a hoisting and lowering member 56 of the mounting fixture 37 (FIG. 12A). After the cover apparatus 5 is installed, the reactor water existing below the cover apparatus 5 is drained from the reactor pressure vessel 1, making the inside of the cover apparatus 5 into the air space 17. At this time, the reactor water exists above the cover apparatus 5. Then a variety of device heads 18 is suspended and lowered through the guide pipe 6 and mounted to the mounting fixture 37. Repair and preventive maintenance operation is carried out by the variety of device heads 18 mounted to the mounting fixture 37. The various device heads include (1) a visual testing head (VT), (2) an ultrasonic testing head (UT), (3) an eddy-current testing head (ECT), (4) an etching/replica testing head, (5) a magnetic particle testing head (MT), (6) a penetrant testing head (PT), (7) a polishing head, (8) a welding head, (9) a water jet (WJP) head, and so on.

The heads used in the present embodiment are the following three kinds: (6) the penetrant testing head, (7) the polishing head, and (8) the welding head. The cover apparatus 5 is used to make the entire region below the cover apparatus 5 into an air environment, allowing pre-weld polishing, welding, after-weld polishing, and weld testing (PT) to be sequentially and continuously performed for all the instrumentation nozzles 3, so that the operation period can be shortened.

Operation procedure is explained in detail with reference to FIGS. 2 to 5 and 14.

(Step S1)

Installation procedure for the common access apparatus 5 1s explained.

Figure 2:
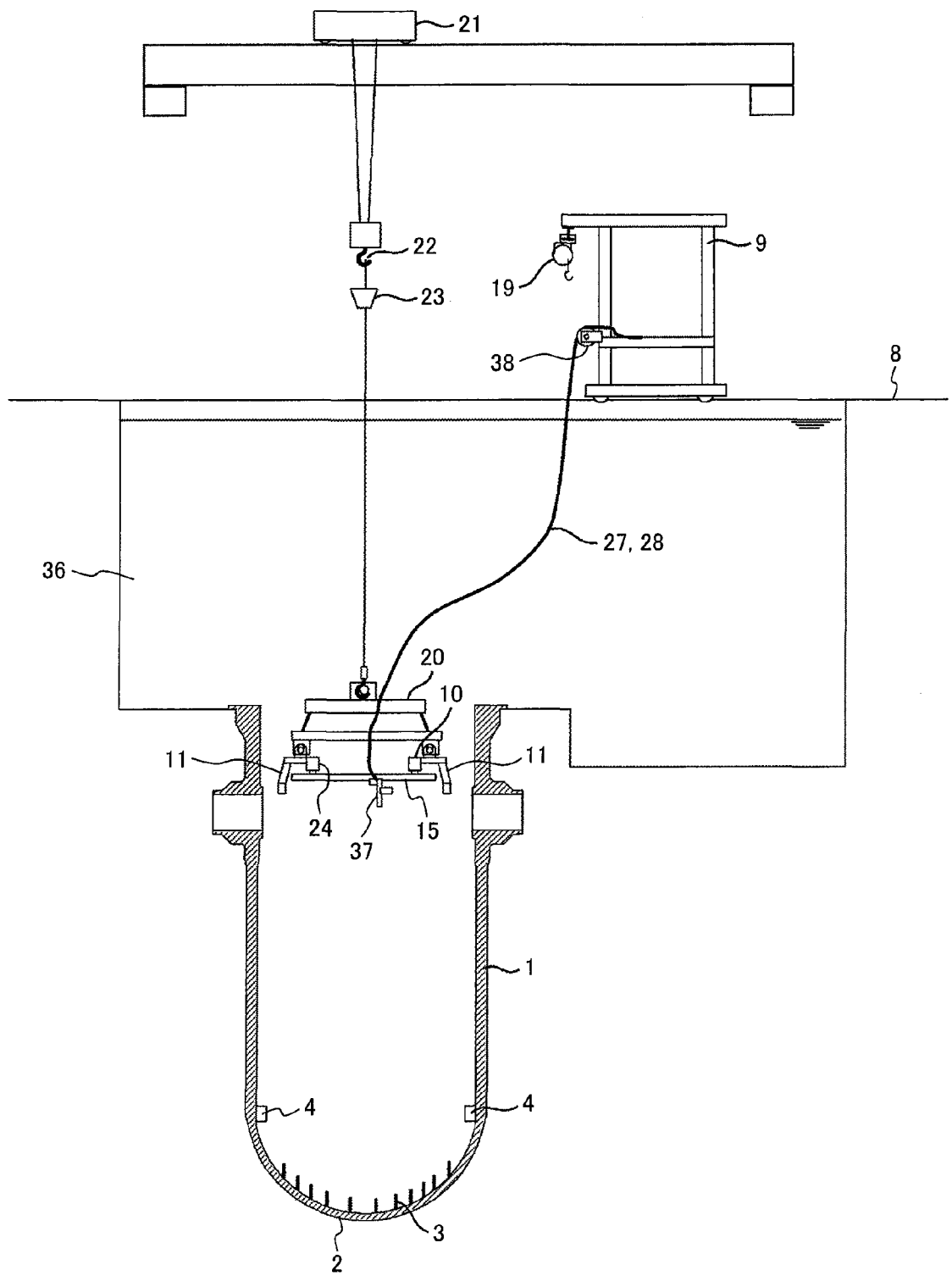
FIG. 2 is an explanatory drawing showing a suspended common access apparatus being gone down.

FIG. 2 shows the common access apparatus 10 being suspended and lowered to the bottom region in the reactor pressure vessel 1. The common access apparatus 10 is suspended and lowered using a ceiling crane 21 with a hanging balance 20. In doing so, if a hook 22 of the ceiling crane 21 cannot be directly immersed into the reactor water, an electric chain block 23 hung from the hook 22 is used for hanging and lowering the common access apparatus 10. Alternatively, an electric chain block 19 of the operation carriage 9 may be used for hanging and lowering the common access apparatus 10. The hanging balance 20 has at least three hanging points for hanging the common access apparatus 10. The common access apparatus 10 is lowered by the ceiling crane 21 after the lengths to the three hanging points are pre-adjusted to maintain the levelness of the common access apparatus 10. In addition, the angles of the plurality of legs 11 are pre-set based on the positions of the instrumentation nozzles 3 supporting the common access apparatus 10.

Figure 3A:
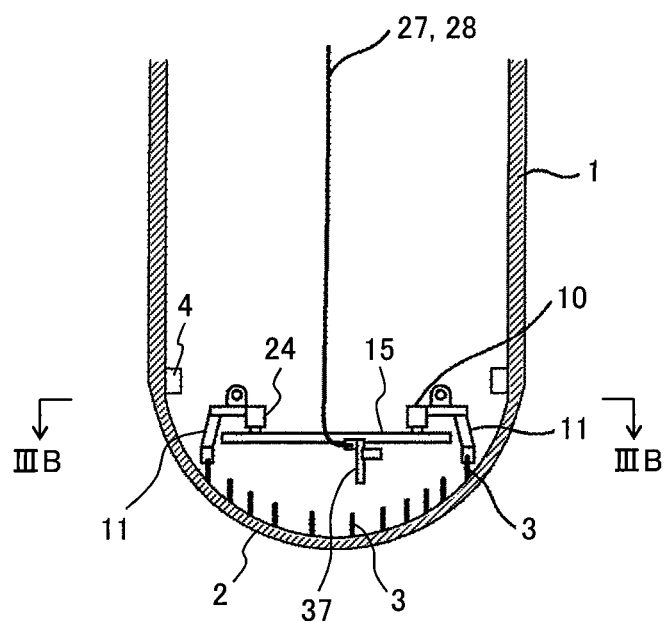
FIG. 3A is an explanatory drawing showing a common access apparatus disposed on a bottom portion of a reactor pressure vessel in the reactor pressure vessel.
Figure 3B:
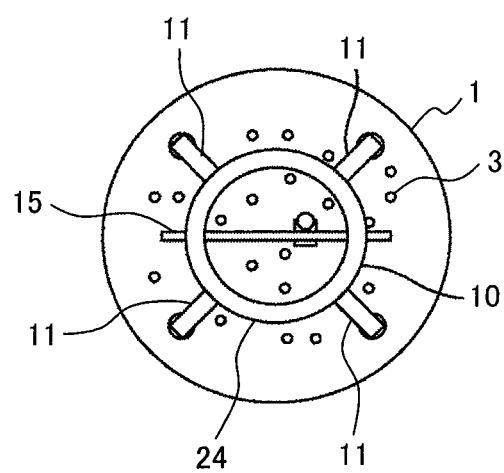
FIG. 3B is a sectional view taken along a line IIIB-IIIB of FIG. 3A.

FIGS. 3A and 3B show the common access apparatus 10 set up on the bottom portion of the reactor pressure vessel 1. After the legs 11 are set on top portions of the instrumentation nozzles 3, the legs 11 grasp the instrumentation nozzles 3 to fix the common access apparatus 10. Although the grasping method is not shown in FIGS. 3A and 3B, it can be achieved by operation of a pneumatic or hydraulic cylinder. In FIG. 3B, the legs 11 grasp, as an example, at 4 positions, however, grasping at 3 positions is also allowed as long as the repair operation site can keep its center of balance. The common access apparatus 10 is set while being monitored by underwater cameras suspended around the common access apparatus 10.

(Step S2)

Installation procedure for the cover apparatus 5 is described as follows.

Figure 4:
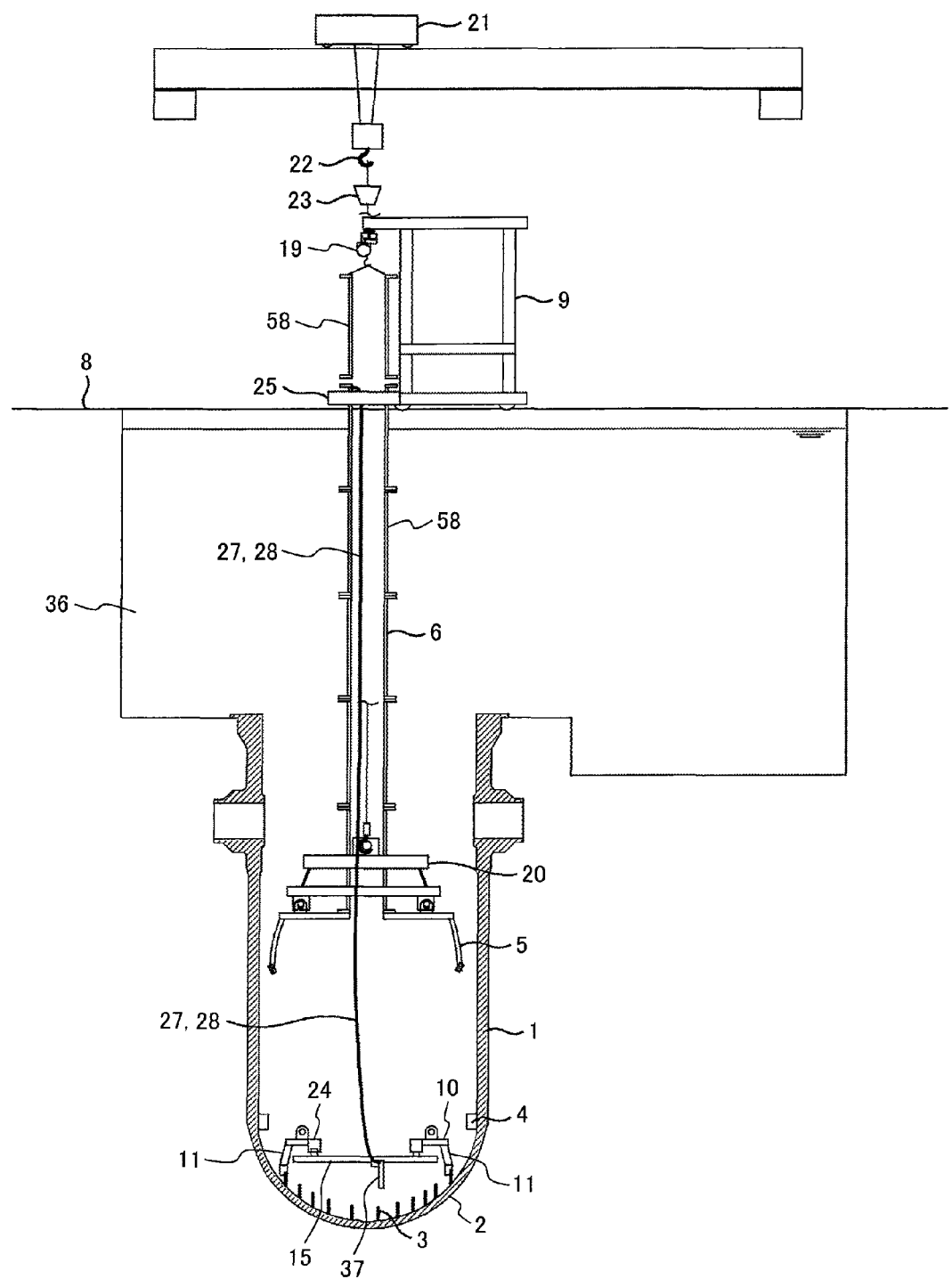
FIG. 4 is an explanatory drawing showing a suspended cover apparatus being gone down.

FIG. 4 shows the cover apparatus 5 being suspended and lowered into the reactor pressure vessel 1. The cover apparatus 5 is, for example, a dome-shaped cover apparatus. Application of this dome-shaped cover apparatus is due to the consideration that the space between the core support member 4 and the instrumentation nozzles 3 disposed in outermost peripheral position of all the is not very wide in the reactor pressure vessel 1. In addition, a space is needed inside the cover apparatus 5 for setting the common access apparatus 10, thus consideration was made in setting the cover apparatus 5 to improve the workability of the hanging and lowering operation by minimizing the space between the cover apparatus 5 and the core support member 4 when the cover apparatus 5 is passed by the core support member 4, yet maximizing the inside space afterward.

The cover apparatus 5 is suspended and lowered using the ceiling crane 21 via the hanging balance 20. In doing so, the hanging balance 20 hanging the cover apparatus 5 is hung from the electric chain block 23 that is hung from the hook 22 of the ceiling crane 21. The hanging balance 20 has at least three hanging points to hang and lower the cover apparatus 5, and the lengths to the three hanging points are adjusted to maintain the levelness of the suspended cover apparatus 5 before the cover apparatus 5 is lowered.

Figure 5:
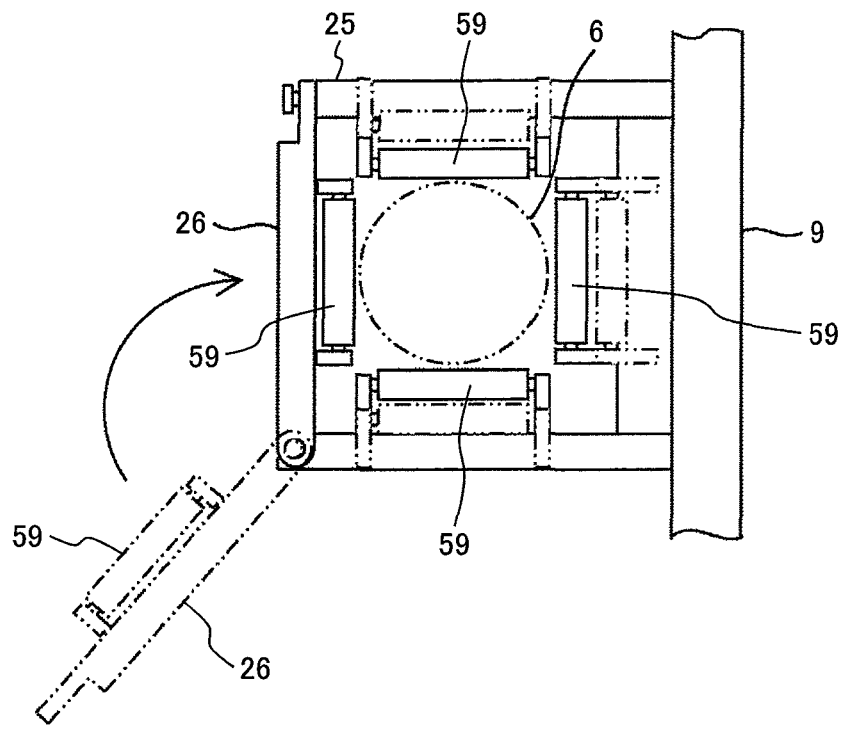
FIG. 5 is a structural diagram showing a guide pipe supporting portion of an operation carriage shown in FIG. 1A.
Figure 6:
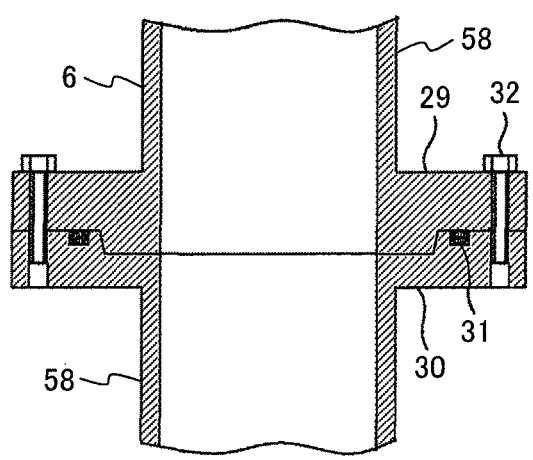
FIG. 6 is a longitudinal sectional view showing a connection portion of a guide pipe shown in FIG. 1A.

As the suspended cover apparatus 5 is lowered, a guide pipe 6 is connected to the top surface of the cover apparatus 5. The guide pipe 6 is dividable into the plurality of tubular pieces 58 in the axial direction, and each connection portions between the tubular pieces 58 has a sealing structure. The tubular pieces 58 are connected to form the guide pipe 6 by a worker in an air space above the operation carriage 9 movable on the operation floor 8. A U-shaped guide pipe support member 25 is installed on a side of the operation carriage 9, as shown in FIG. 5. After the guide pipe 6 is placed through a space surrounding by a U-shaped portion of the guide pipe support member 25, an opening member 26 being a part of the U-shaped portion is closed to guide the guide pipe 6. The U-shaped portion in which the opening member 26 was closed prevents the guide pipe 6 from being tilted. As the cover apparatus 5 is gone down, when top end of the guide pipe 6, that is, top end of the tubular piece 58 connected to the cover apparatus 5 is leveled with the guide pipe support member 25 on the operation carriage, the lowering of the cover apparatus 5 is stopped at once. In this state, another tubular piece 58 to be mounted on top is hoisted by the chain block 19 of the operation carriage, and connected to the top of the tubular piece 58 connected to the cover apparatus 5. When a connecting flange portion of the guide pipe 6 passes through the guide pipe supporter 25, a guiding portion of the guide pipe support member 25 expands to prevent interference. The guiding portion has four rollers 59 that contact with an outer surface of the guide pipe 6 to guide the guide pipe 6. Each roller 59 that is movable in horizontal direction attached to the guide pipe support member 25. Each roller 59 is pressed against the guide pipe 6 by spring member for contacting with the guide pipe 6. A cable 27 and an air hose 28 from the common access apparatus 10 are fixed to the top portion of the lower tubular piece 58 of the guide pipe 6. After the upper tubular piece 58 is connected on top of the lower tubular piece 58, the cable 27 and air hose 28 fixed to the top portion of the lower tubular piece 58 are pulled up to the uppermost portion of the upper tubular piece 58 by a jig, and are connected to a control apparatus installed on the operation carriage 9, through the guide pipe 6. As shown in FIG. 6, a lower portion 29 of the upper tubular piece 58 has a protruding surface while an upper portion 30 of the lower tubular piece 58 has a recessed surface and a sealing 31 around its circumference, and after these surfaces are fitted together, a bolt 32 is inserted to join these tubular pieces 58. This procedure is repeated until the cover apparatus 5 is set on the bottom portion of the reactor pressure vessel 1.

Figure 7:
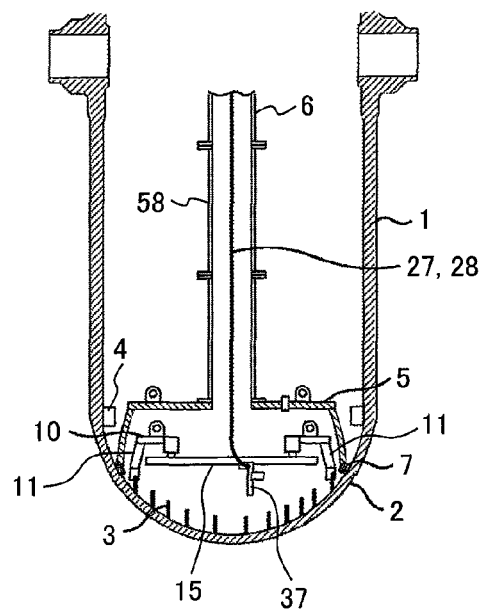
FIG. 7 is an explanatory drawing showing a cover apparatus disposed on a bottom head in a bottom portion of a reactor pressure vessel.

FIG. 7 shows the cover apparatus 5 set on the bottom head 2 of the reactor pressure vessel 1. The cover apparatus 5 covers all the instrumentation nozzles 3, and the common access apparatus 10 set up on the instrumentation nozzles 3 in the previous operation. An elastic material suitable for the inner surface of the reactor pressure vessel 1 is provided all around the outer circumference of the cover apparatus 5 as the sealing member 7.

Figure 8:
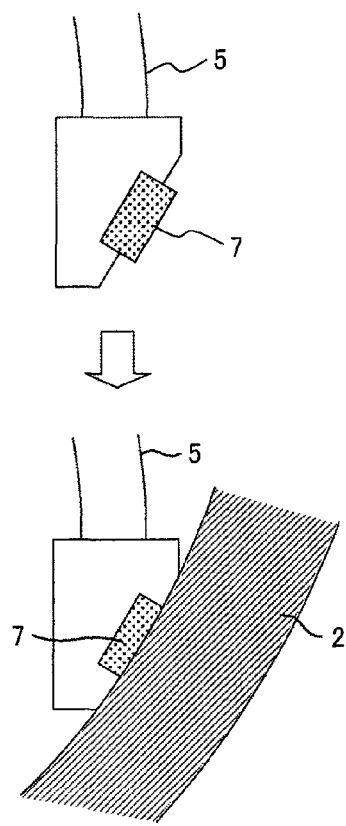
FIG. 8 is an enlarged view of a sealing portion formed in a cover apparatus shown in FIG. 1A.
Figure 9:
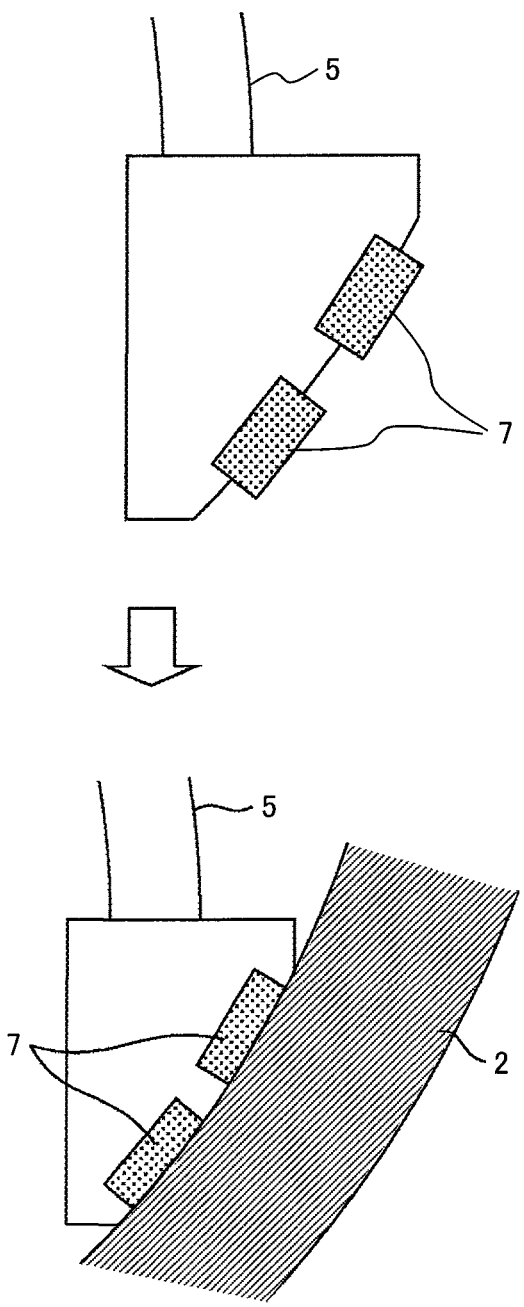
FIG. 9 is an expanded view of another embodiment of a sealing portion formed in a cover apparatus.

FIG. 8 is an expanded view of the sealing member 7 when the cover apparatus 5 is set on the bottom head 2 of the reactor pressure vessel 1. Since the setting surface of the bottom head 2 is a sloped surface with a curvature, the setting porting of the cover apparatus 5 has a shape that fits to the sloped surface of the bottom head 2, as well as the sealing member 7 that has a shape that fits to this sloped surface. The sealing member 7 is pressed against the bottom head 2 of the reactor pressure vessel 1 by the cover apparatus 5's own weight, and compressed to seal between the cover apparatus 5 and the bottom head 2 of the reactor pressure vessel 1, thereby preventing the reactor water existing above the cover apparatus 5 from entering into the cover apparatus 5. As shown FIG. 9, two sealing members 7 may be concentrically provided all around the outer circumference of the cover apparatus 5.

(Step S3)

Draining procedure of the reactor water existing below the cover apparatus 5 is explained.

Figure 10:
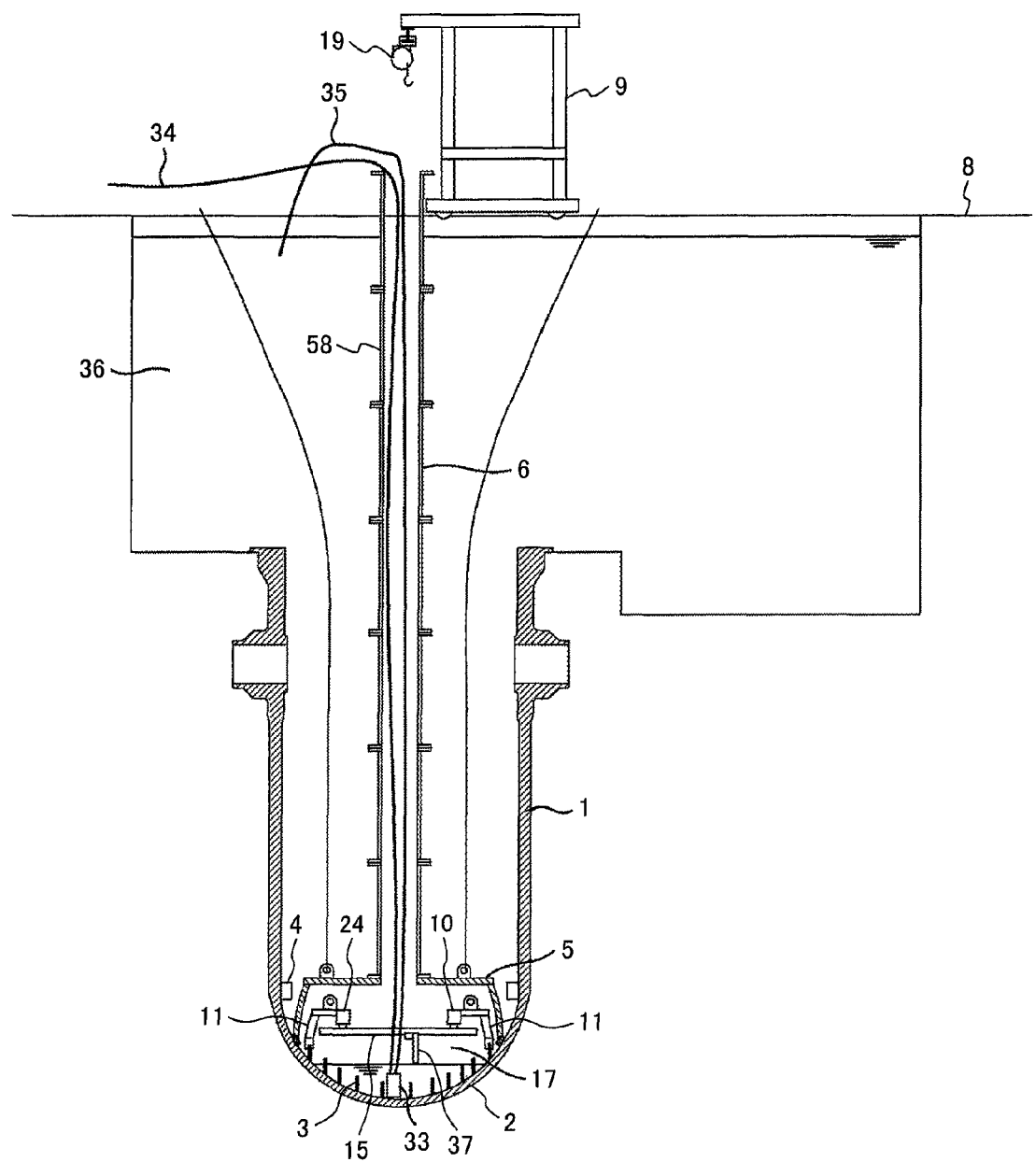
FIG. 10 is an explanatory drawing showing an operation in which cooling water existing below a cover apparatus is drained from a reactor pressure vessel.

FIG. 10 shows drain of the reactor water existing below the cover apparatus 5.

Since the reactor pressure vessel 1 of a pressurized water reactor has no drain pipe for water drainage, a deep well underwater pump 33 is used to drain the reactor water below the cover apparatus 5. The deep well underwater pump 33 is suspended and lowered to the center portion of the bottom of the reactor pressure vessel 1 through the guide pipe 6 for set up. A power cable 34 and a drain hose 35 connected to the deep well underwater pump 33 is passed through the guide pipe 6 connected to the cover apparatus 5, and the outlet of the drain hose 35 is placed in a reactor well 36 formed above the reactor pressure vessel 1. This makes the reactor water in the cover apparatus 5 get sucked up by the deep well underwater pump 33 and discharged into the reactor well 36 through the drain hose 35. The reactor water level in the reactor well 36 is adjusted using the equipment of the nuclear power plant. By draining the reactor water from the inside of the cover apparatus 5, hydraulic head pressure of the reactor water above the cover apparatus 5 is added to the cover apparatus 5, which beneficially improves a sealing effect due to an additional force pressing against the inner surface of the reactor pressure vessel 1 beside the weight of the cover apparatus 5. A concern arises that the cover apparatus 5 may be inwardly deformed by the hydraulic head pressure added to the cover apparatus at that time, creating a gap between the sealing member 7 and the inner surface of the reactor pressure vessel 1. However, a mounting portion of the sealing member 7 has a circular shape, which is resistant to inward deformation, and made rigid to prevent inward deformation.

When the water drainage from the inside of the cover apparatus 5 is completed, the drain hose 35 and the deep well underwater pump 33 set in the center portion of the bottom of the reactor pressure vessel 1 are pulled up through the guide pipe 6.

(Step S4)

Mounting procedure for the variety of device heads 18 is explained.

Figure 11:
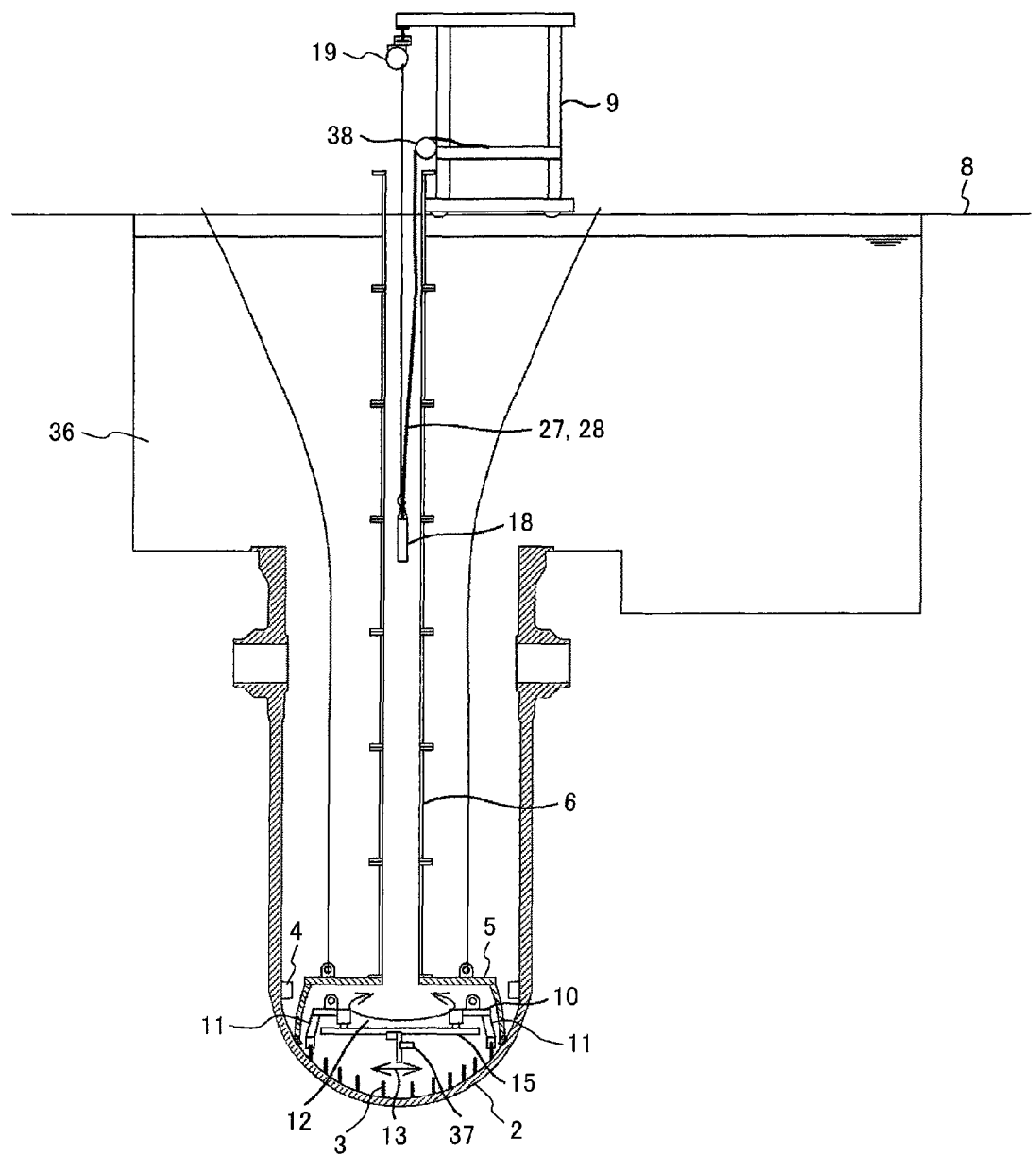
FIG. 11 is an explanatory drawing showing procedure for mounting a variety of device heads to a common access apparatus.

FIG. 11 shows the procedure for mounting the variety of device heads 18 to the common access apparatus 10.

The mounting fixture 37, to which the variety of device heads 18 are mounted, provided to the arm 15 of the common access apparatus 10 is moved to a position directly below the guide pipe 6 using the circular movement 12 of the arm 15 and the radial movement 13 of the mounting fixture 37. Then, the variety of device heads 18 is suspended and lowered from the operation carriage 9 into the guide pipe 6 to be mounted to the mounting fixture 37 provided to the arm 15 of the common access apparatus 10, by using the electric chain block 19. When the variety of device heads 18 is being lowered, the cable 27 and the air hose 28 attached to the variety of device heads 18 are fixed to the operation carriage 9 and lowered with the variety of device heads 18, being guided by a guide roller 38.

Figure 12B:
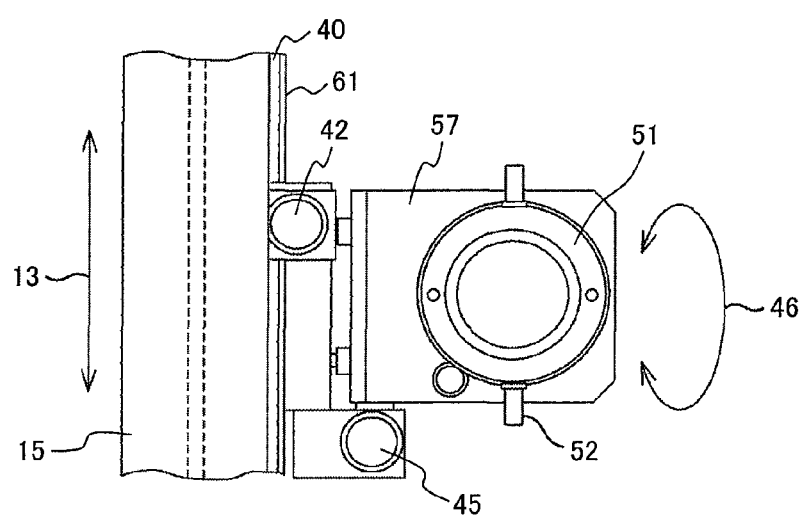
FIG. 12B is a sectional view taken along a line IIIB-IIIB of FIG. 12A.

FIG. 12 shows a detailed structure of the mounting fixture 37. The mounting fixture 37 that can move along the arm 15 is attached to the arm 15. A linear guide 40 in which a rack 61 is formed is fixed to an underside of the arm 15. The mounting fixture 37 has a support body 60, electric motors 42, 45 and 49, a linear guides 43, a ball thread 44, and the hoisting and lowering member 56. The support body 60 to which the electric motor 42 is fixed is attached to the linear guide 40 as the support body 60 can be slid. The electric motor 42 for creating the radial movement 13 generates a radial drive. A pinion 41 attached to a rotation shaft of the electric motor 42 meshes the rack 61. The linear guide 43 is attached to the support body 60 and lengthens from the support body 60 toward a lower position. The electric motor 45 for creating the vertical movement 14 is attached to the support body 60. A ball thread 44 is disposed along the linear guide 43. A lower portion of the ball thread 44 is attached to the linear guide 43 as it can rotate, and an upper portion of the ball thread 44 is attached to the support body 60 as it can rotate. The ball thread 44 is joined with a rotation shaft of the electric motor 45. The hoisting and lowering member 56 has an electric motor 45, a bearing 47, a gear 48, a holding member 51, a single pair of clamp cylinders 52 and a support plate 57. The support plate 57 to which the electric motor 45 and the bearing 47 were attached meshes the ball thread 44 as it can move in a vertical direction. The holding member 51 is attached to bearing 47 and has a positioning pin 50 for defining a mounting position of the variety of device heads 18. The gear 48 surrounds the holding member 51 and is attached around the holding member 51. The gear 48 is rotated by the electric motor 49 for creating a spinning movement 46 of the holding member 51 and then the holding member 51 is rotated. The single pair of clamp cylinders 52 is attached to the holding member 51.

The support body 60 is moved along the linear guide 40 by the rotation of the electric motor 42 and thus the holding member 51 of the mounting fixture 37 reaches to a position directly below the guide pipe 6. The variety of device heads 18 suspended and lowered through the guide pipe 6 reaches in the vicinity of the holding member 51. The variety of device heads 18 is positioned against the holding member 51, and then the variety of device heads 18, aligned to the direction of the positioning pin 50, set to the holding member 51. The variety of device heads 18 held by the holding member 51 is fixed with the clamp cylinder 52.

Figure 13:
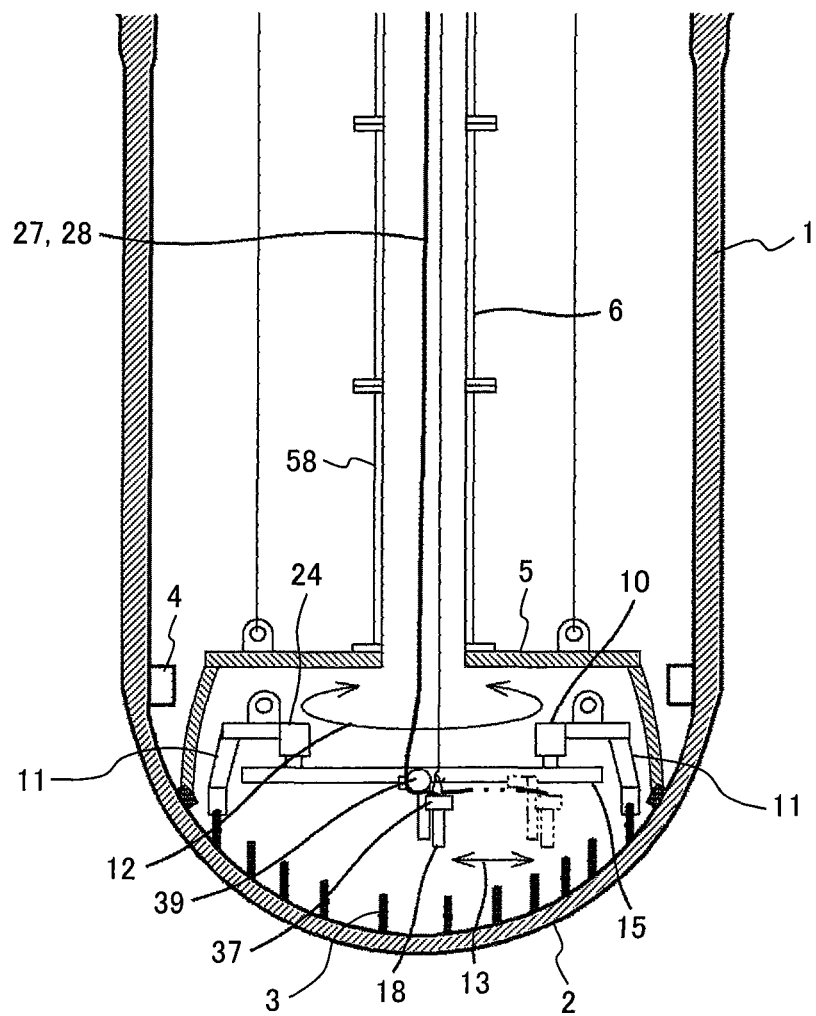
FIG. 13 an explanatory drawing showing a cable and an air hose connected to a variety of device heads after the variety of device heads is mounted to a common access apparatus.
Figure 14:
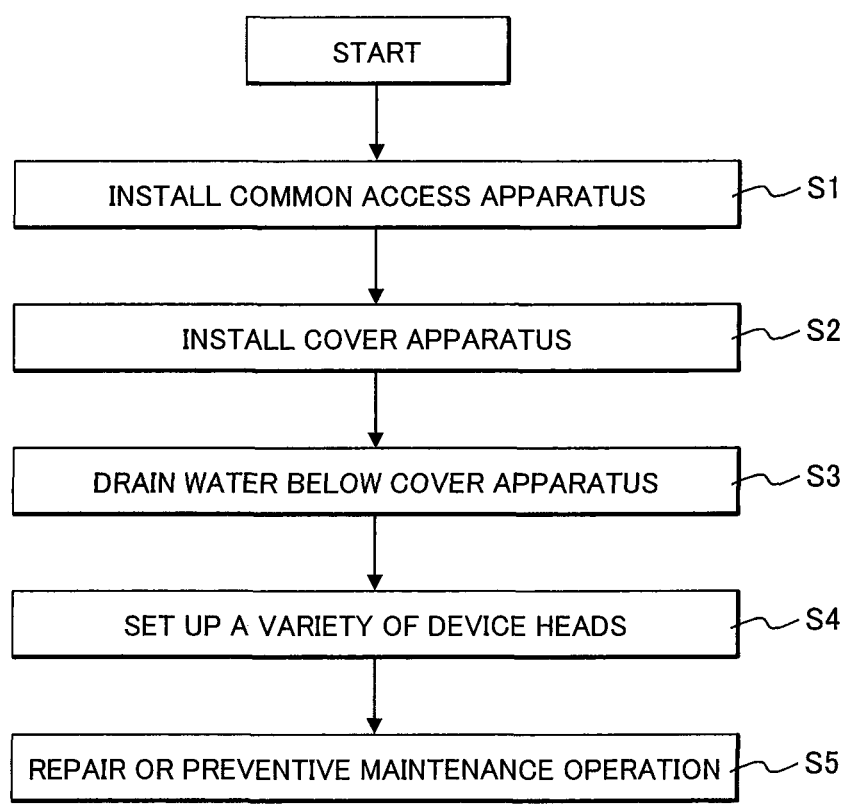
FIG. 14 is a flow chart showing operation procedure of a method for managing internal equipment according to Embodiment 1.

FIG. 13 shows the cable 27 and the air hose 28 when the variety of device heads 18 is moved by the radial movement 13 and the vertical movement 14 after being mounted to the mounting fixture 37. When the radial movement 13 and the vertical movement 14 are performed, the cable 27 and the air hose 28 connected from the operation carriage 9 to the device head 18 through the guide pipe 6 can move together the hoisting and lowering member 56 of the mounting fixture 37 in the radial direction and vertical direction without interfering with the frame of the common access apparatus 10 and so on since they are guided by a guide roller 39 installed to the frame of the common access apparatus 10.

By performing the procedures of steps 1 to 4 described above, preparation for repair and preventive maintenance operation on the instrumentation nozzles 3 is completed. The repair and preventive maintenance operation (step S5) on the instrumentation nozzles 3, then, can be started.

In the repair and preventive maintenance operation (step S5) on the instrumentation nozzles 3 (internal equipments), the variety of device heads 18 is changed according to the operation procedure and welding operation is performed. When the welding operation is performed, a series of operations such as pre-weld polishing, welding, after-weld polishing, after-weld size measurement, and after-weld testing (penetrant testing [PT]) of the surface of the operation target (the instrumentation nozzle 3). Thus, the operation is performed by changing the device head 18 to the one corresponding to each operation.

Figure 16:
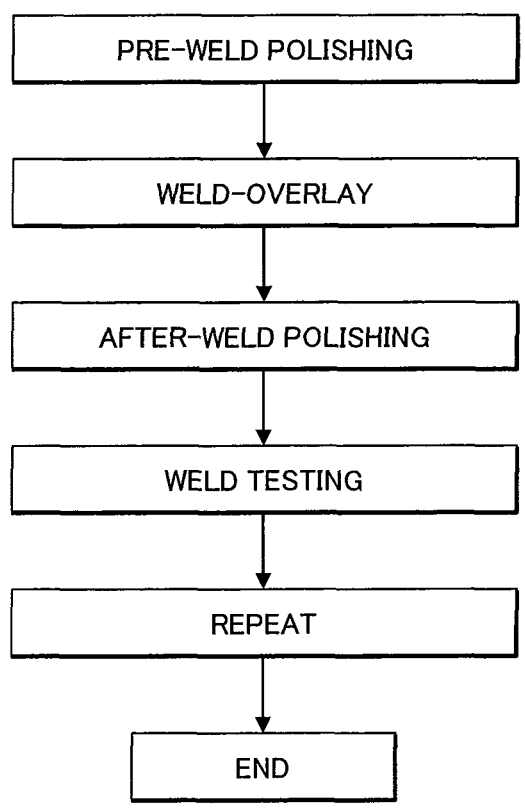
FIG. 16 is a flow chart showing preventive maintenance operation procedure in step S5 shown in FIG. 14.
Figure 17A:
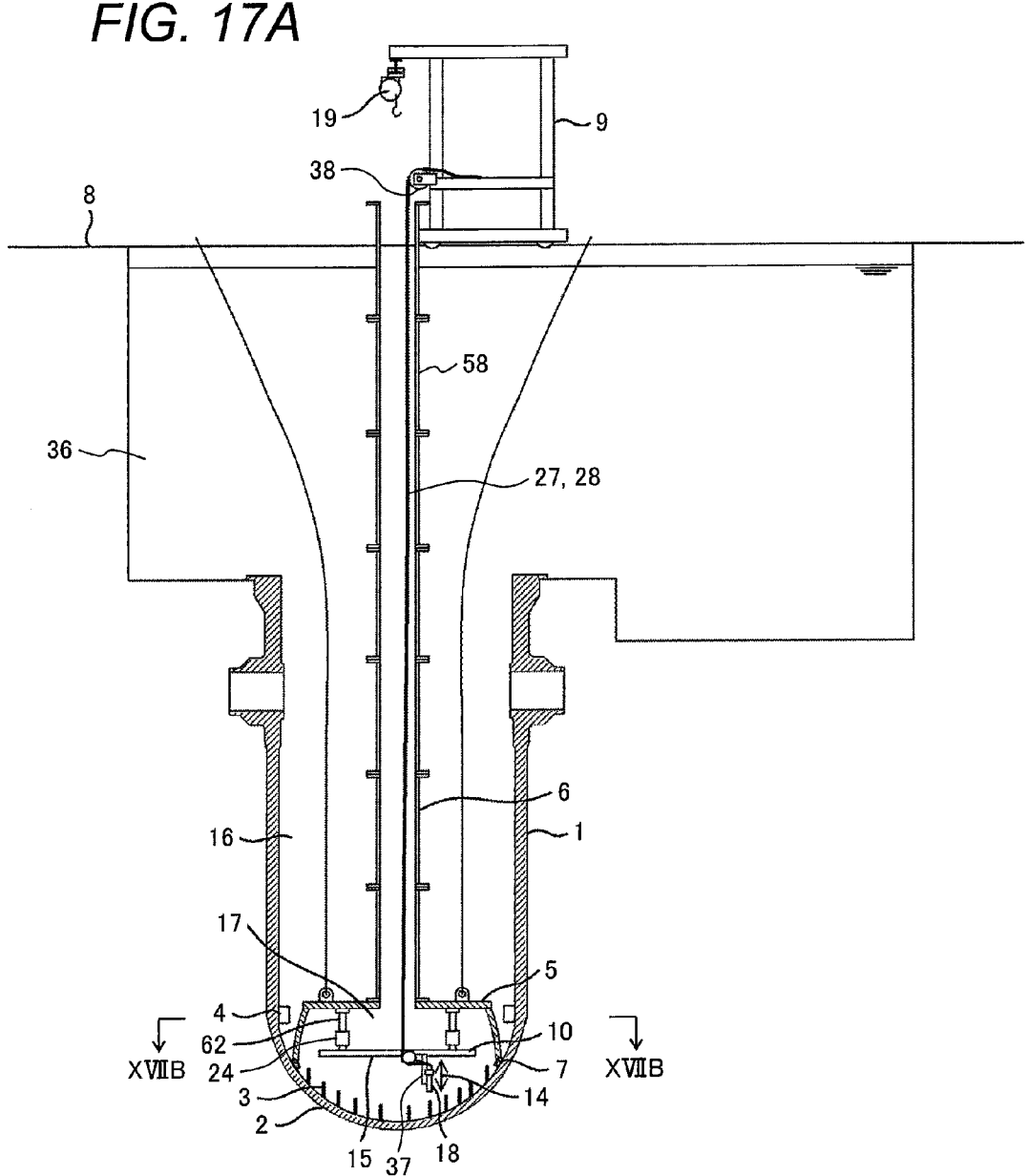
FIG. 17A is an explanatory drawing showing a method for managing internal equipment in a reactor pressure vessel according to Embodiment 2 which is another embodiment of the present invention, applied to a pressurized water reactor plant, and a construction of a management apparatus used in the method for managing the internal equipment.
Figure 17B:
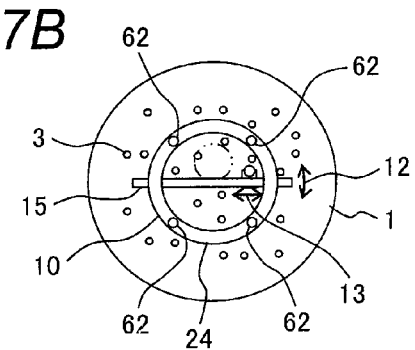
FIG. 17B is a sectional view taken along a line XVIIB-XVIIB of FIG. 17A.

Operation procedure for preventive maintenance of the repair and preventive maintenance operation performed in step S5 is explained next. Existence of cracks in the instrumentation nozzle 3 is checked by VT and when no crack is found, the preventive maintenance operation is performed against the instrumentation nozzle 3 having no crack. A variety of device heads 18 for preventive maintenance welding is mounted to the holding member 51 of the mounting fixture 37 as the operation procedure for preventive maintenance shown in FIG. 16. That is, the variety of device heads 18 mounted to the holding member 51 is set to the target region of the instrumentation nozzle 3 and changed according to the operation (pre-weld polishing, weld-overlay, after-weld polishing, weld test [PT]) and thus a series of the preventive maintenance operation against the instrumentation nozzles 3 having no crack is performed. These operations are repeated until all the targets (instrumentation nozzles 3) are completed. The operations can be continuously performed once the cover apparatus 5 and the common access apparatus 10 are installed so that the operation time is shortened. Then, the variety of device heads 18, the cover apparatus 5 and the common access apparatus 10 are removed form the reactor pressure vessel 1. The WJP may be performed afterward.

Figure 15:
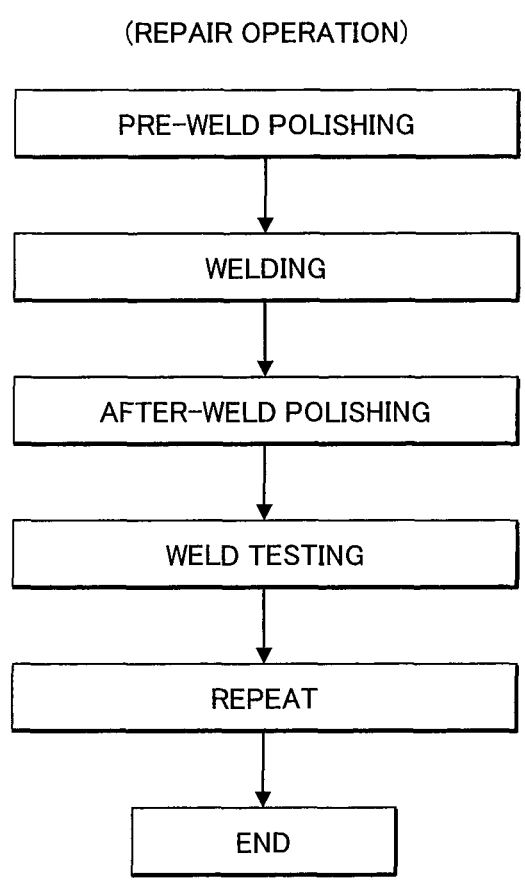
FIG. 15 is a flow chart showing repair operation procedure in step S5 shown in FIG. 14.

Operation procedure for repair operation of the repair and preventive maintenance operation performed in step S5 is explained next. If a crack is found in the instrumentation nozzle 3 by VT, the position and the range of the crack in the instrumentation nozzle 3 are inspected and the cause of the crack is investigated using the procedures of UT, ECT, and replica. Then, the target region of the instrumentation nozzle 3 is repaired. In the repair operation, a variety of device heads 18 for the repair is mounted to the holding member 51 of the mounting fixture 37 as the operation procedure for the repair shown in FIG. 15. That is, the variety of device heads 18 mounted to the holding member 51 is set to the target region of the instrumentation nozzle 3 having the crack and changed according to the operation (pre-weld polishing, welding, after-weld polishing, weld test [PT]). These operations are repeated until all the targets (instrumentation nozzles 3) are completed. The operations can be continuously performed once the cover apparatus 5 and the common access apparatus 10 are installed so that the operation time is shortened.

According to the present embodiment, all the preventive maintenance and repair operations can be performed with the various device heads 18 at once. The present embodiment allows, by making the entire region in the cover apparatus 5 into an air environment, pre-weld polishing, welding, after-weld polishing, and weld testing (PT) to be sequentially and continuously performed to all the instrumentation nozzles 3, so that the operation period can be shortened.

According to the present embodiment, by using the managing apparatus of a bottom portion of a reactor pressure vessel, having the common access apparatus 10 including the mounting fixture 37 to which the variety of device heads 18 for the repair or the preventive maintenance is mounted, set up in the bottom region of the reactor pressure vessel 1, and the cover apparatus 5 for covering, at once, a plurality of instrumentation nozzles 3 and the common access apparatus 10, set up on the inner surface of the bottom portion of the reactor pressure vessel 1, the reactor water existing below the cover apparatus 5 can be only drained from the reactor pressure vessel. As a consequence, in a state that the reactor water is above the cover apparatus 5 in the reactor pressure vessel 1, the air space 17 being a limited region is formed between the cover apparatus 5 and the bottom portion (bottom head 2) of the reactor pressure vessel 1.

Therefore, the present embodiment can perform a series of operations (polishing, welding, pre-weld polishing, weld size measurement, and penetrant testing [PT]) for managing, for example, the instrumentation nozzles 3 even in the bottom region below the underwater environment 16 formed above the cover apparatus 5 in the reactor pressure vessel 1.

Besides, the present embodiment can minimize a region for reactor water removal, and suppress an increase in the radiation equivalent rate on an operation floor by shielding effect of the reactor water being above the cover apparatus 5 in the reactor pressure vessel 1.

According to the present embodiment, since the common access apparatus 10 is provided with the mounting fixture 37 having the hoisting and lowering member 56 to which the variety of device heads 18 can be mounted, a series of welding procedures are allowed by changing the variety of device heads 18 through the guide pipe 6 connected to the top surface of the cover apparatus 5, e.g., a welding device head to a polishing device head, and so on, according to the operation procedure, and the variety of device heads 18 can be set to the position of any instrumentation nozzles 3 by circular, radial, and vertical movements of the common access apparatus 10.

Thus, continuous repair or preventive maintenance operation to the plurality of instrumentation nozzles 3 can be performed. Further, a number of the instrumentation nozzles 3 disposed in the reactor pressure vessel can be repaired or preventively maintained efficiently.

According to the present embodiment, the setting in the underwater environment 16 of a variety of apparatus being used in the present embodiment is carried out as follows: after the common access apparatus 10 is set up in the underwater environment 16, the cover apparatus 5 is installed to obtain the air space 17 in the bottom region of the reactor pressure vessel 1. Then, a variety of device heads 18 can be mounted to the holding member 51 of the mounting fixture 37 disposed in the air space 17 through the guide pipe 6. Consequently, the common access apparatus 10 is only required underwater specifications, and the variety of device heads 18 having complex functions only satisfies specifications in air.

Thus, the present embodiment can reduce cost by eliminating underwater specifications from various device heads 18 used for repair or preventive maintenance, making the device heads specifications simple.

Accordingly, according to the present embodiment, the need of water removal from the entire reactor can be eliminated; the repair or preventive maintenance operation for all the instrumentation nozzles 3 in the bottom region of the reactor pressure vessel 1 can be performed effectively and in a relatively shortened period; and radiation exposure to workers can be reduced. Further, highly reliable repair or preventive maintenance operation can be achieved.

[Embodiment 2]

FIGS. 14A and 14B show embodiment 2 of the present invention, in which a cover apparatus 5 and a common access apparatus 10 are joined as one body. In an managing apparatus of a bottom portion of a reactor pressure vessel, used in the present invention, the common access apparatus 10 is joined to the cover apparatus 5 by a plurality of support rods 62. The common access apparatus 10 joined to the cover apparatus 5 is disposed in the cover apparatus 5. A guide pipe 6 is connected to top surface of the cover apparatus 5. The cover apparatus 5 is installed to the inner surface of a bottom head 2 of a reactor pressure vessel 1. The outer circumference of the cover apparatus 5 has a sealing member 7 all around to prevent reactor water from entering inside of the cover apparatus 5. The guide pipe 6 is dividable into a plurality of tubular pieces 58 in the axial direction, which the tubular pieces 58 are connected as the cover apparatus 5 is suspended and lowered to the bottom of the reactor pressure vessel 1. The connecting operation of the tubular pieces 58 is performed using an operation carriage 9 movable on an operation floor 8. Since the common access apparatus 10 is suspended inside the cover apparatus 5 by a plurality of support rods 62, combining them into one body, in this installation of the cover apparatus 5, the installation of the common access apparatus 10 is eliminated. Further, the common access apparatus 10 can be installed together the cover apparatus 5 without adding its weight on instrumentation nozzles 3. In addition, the weight of the cover apparatus 5 and the common access apparatus 10, and hydraulic head pressure are used to fix the cover apparatus 5 on the inner surface of the bottom head 2 of the reactor pressure vessel 1, simplifying the structure. The inside of the cover apparatus 5, then, is made into an air space 17, followed by a variety of device heads 18 being suspended and lowered though the guide pipe 6 and mounted to the holding member 51 of mounting fixture 37 for repair or preventive maintenance operation as with the embodiment 1.

The present embodiment can obtain the effects generating in the embodiment 1.

[Embodiment 3]

Figure 18A:
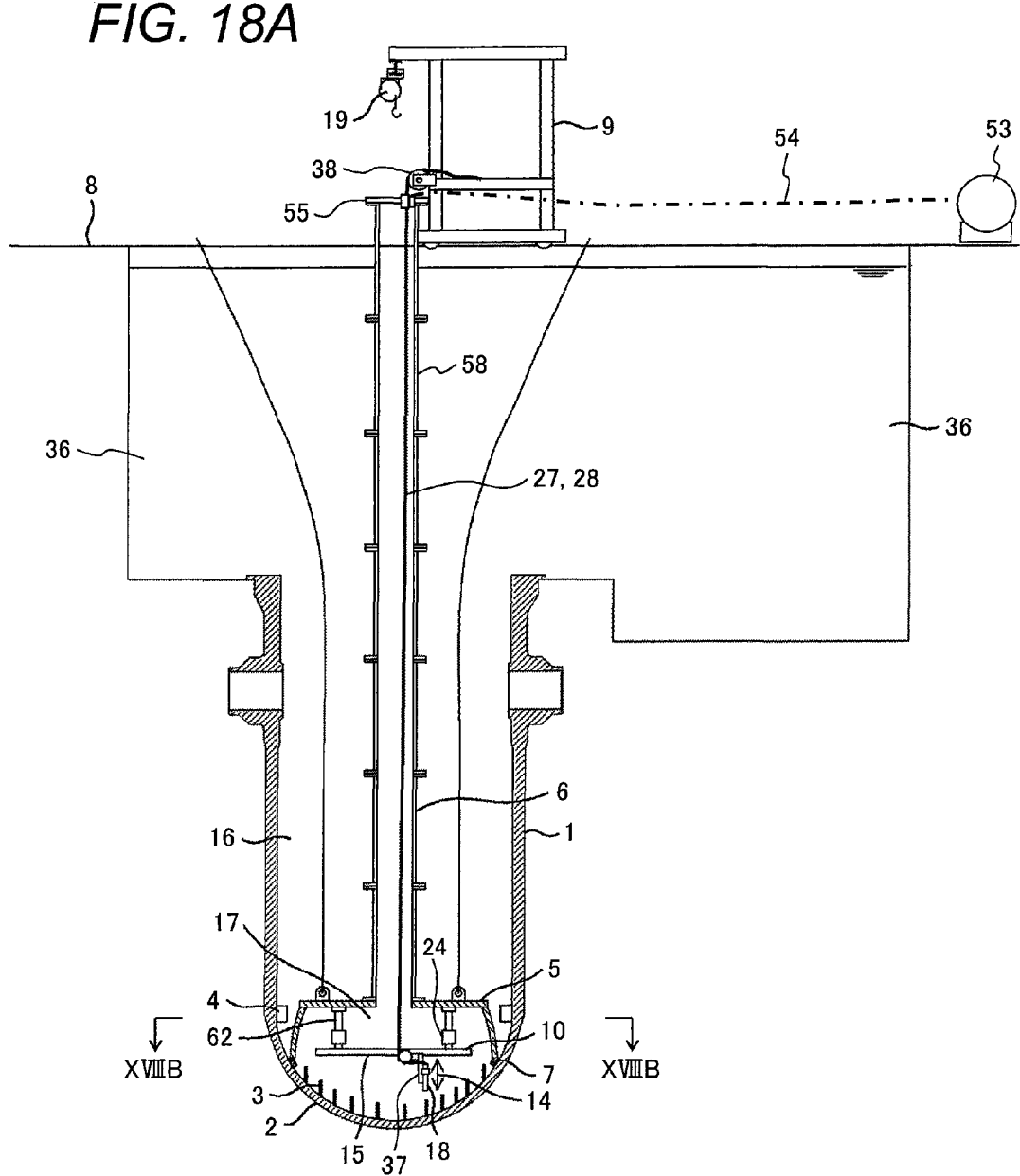
FIG. 18A is an explanatory drawing showing a method for managing internal equipment in a reactor pressure vessel according to Embodiment 3 which is another embodiment of the present invention, applied to a pressurized water reactor plant, and a construction of a management apparatus used in the method for managing the internal equipment.
Figure 18B:
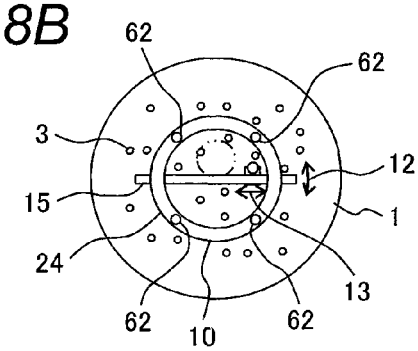
FIG. 18B is a sectional view taken along a line XVIIIB-XVIIIB of FIG. 18A.

FIGS. 18A and 18B show embodiment 3 of the present invention, in which the inside of the cover apparatus 5 is gas-purged to prevent the reactor water in the reactor well 36 from entering into the cover apparatus 5.

An managing apparatus of a bottom portion of a reactor pressure vessel, used in the present invention, is also provided with the cover apparatus 5 and the common access apparatus 10 joined to the cover apparatus 5 by a plurality of support rods 62 as with the embodiment 2. This managing apparatus has a gas-purging pump 53, a hose 54 connected to the gas-purging pump 53 and a closing plate 55 for closing the guide pipe 6.

When reactor water inside the cover apparatus 5 is sucked, the air space 17 inside the cover apparatus 5 will have negative pressure as the water level is lowered. When the pressure in the cover apparatus 5 is reduced below the hydraulic head pressure of the level of the cover apparatus 5 set on the inner surface of the reactor pressure vessel 1, the negative pressure may result in generating force to draw the reactor water being above the cover apparatus 5 in the reactor pressure vessel 1. In this case, gas pressurized by the gas-purging pump 53 is purged from the guide pipe 6 into the cover apparatus 5 through the hose 54 to make, in the cover apparatus 5, the internal pressure higher than the hydraulic head pressure of the level of the cover apparatus 5 installed. One end of the hose 54 reaches in the cover apparatus 5 through the guide pipe 6. At this time, the closing plate 55 is mounted on top of the guide pipe 6 beforehand to make the inside of the cover apparatus 5 and the guide pipe 6 into a closed space. A sealing rubber material is used to seal between the closing plate 55 and the cable 27 and the air hose 28 penetrating the closing plate 55, to prevent the purged gas from leaking. This provides a leak prevention effect.

The present embodiment can obtain the effects generating in the embodiment 2.

REFERENCE SIGNS LIST

1: reactor pressure vessel, 2: bottom head, 3: instrumentation nozzle, 4: core support member, 5: cover apparatus, 6: guide pipe, 7: seal member, 8: operation floor, 9: operation carriage, 10: common access apparatus, 11: leg, 12: circular movement, 13: radial movement, 14: vertical movement, 15: arm, 16: underwater environment, 17: air space, 18: a variety of device heads, 19, 23: electric chain block, 20: hanging balance, 21: ceiling crane, 22: hook, 24: annular support member, 25: guide pipe support member, 26: opening member, 27: cable, 28: air hose, 29: lower portion, 30: upper portion, 31: sealing, 32: bolt, 33: deep well underwater pump, 34: power cable, 35: drain hose, 36: reactor well, 37: mounting fixture, 38, 39: guide roller, 40, 43: linear guide, 41: pinion, 42, 45, 49: electric motor, 44: ball thread, 46: spinning movement, 47: bearing, 48: gear, 50: positioning pin, 51: holding member, 52: clamp cylinder, 53: gas-purging pump, 54: hose, 55: closing plate, 56: hoisting and lowering member, 57: support plate, 58: tubular piece, 59: roller, 60: support body, 61: rack, 62: support rod.

What is claimed is:

1. A method for managing a reactor pressure vessel, comprising:
    disposing an access apparatus at an inner surface of a bottom portion of the reactor pressure vessel, the access apparatus having an operation head hold member, and drive mechanisms for circular, radial, and vertical movements;
    disposing a cover apparatus for covering a plurality of individual internal instrumentation components penetrating the bottom portion at the inner surface of the bottom portion of the reactor pressure vessel, the cover apparatus being substantially cup shaped and covering the access apparatus and a sloped surface of the bottom portion;
    draining water that is present below the cover apparatus from the reactor pressure vessel, while water that exists above the cover apparatus in the reactor pressure vessel remains in place;
    forming an air environment below the cover apparatus by draining the water;
    pressing the cover apparatus on the inner surface of the bottom portion of the reactor pressure vessel by hydraulic head pressure added to the cover apparatus;
    lowering an operation head into the cover apparatus through a guide pipe attached on the cover apparatus;
    attaching the lowered operation head to the operation head hold member;
    setting the operation head by moving along the operation head hold member to one of the internal instrumentation components covered by the cover apparatus; and
    managing continuously the internal instrumentation components and the bottom portion which is below the cover apparatus by the set operation head, after the cover apparatus has been installed on the inner surface of the bottom portion, without removal of the cover apparatus between managing of each respective one of the plurality of instrumentation components.

2. The method according to claim 1, wherein the access apparatus is placed in the reactor pressure vessel before the cover apparatus is installed.

3. The method according to claim 1, wherein the access apparatus is joined to the cover apparatus.

4. The method according to claim 1, wherein:
    the cover apparatus has a sloped surface contour that fits to a sloped surface contour of a bottom portion of the reactor pressure vessel;
    the cover apparatus has a sealing member; and
    when the cover apparatus is set on an inner surface of said bottom portion of the reactor pressure vessel, the sealing member presses against said inner surface of said bottom portion.

5. The method according to claim 1, wherein the cover apparatus is joined to a guide tube having at least two tubular pieces, said method further comprising:
    joining a first tubular piece to a top portion of the cover apparatus in an air environment;
    lowering the cover apparatus; and
    joining a second tubular piece to a top of the first tubular piece.

6. The method according to claim 1, wherein said managing comprises repair operation.

7. The method according to claim 1, wherein said managing comprises preventive maintenance operation.

8. The method according to claim 6, wherein said repair operation includes:
    pre-weld polishing by a polishing head mounted to the access apparatus;
    welding by a welding head mounted to the access apparatus;
    after-weld polishing by the polishing head mounted to an arm of the access apparatus; and
    weld testing by a penetrant testing head mounted to the access apparatus.

9. The method according to claim 8, wherein said welding comprises applying a weld-overlay.

10. The method according to claim 1, wherein said draining is performed by a pump set up between said cover apparatus and said bottom portion of the reactor pressure vessel.

11. The method according to claim 1, wherein said managing includes repair and preventive maintenance operation for the internal instrumentation components.

12. The method according to claim 1, wherein the cover apparatus covers, at once, all internal instrumentation components installed at the bottom portion.

13. The method according to claim 1, wherein the reactor is a pressurized water reactor.

14. The method for managing a reactor pressure vessel according to claim 1, wherein the operation head is mounted to a mounting fixture that moves along the operation head hold member, by a positioning and a clamp mechanism.

15. The method for managing a reactor pressure vessel according to claim 1, wherein the cover apparatus disposed at the inner surface of the bottom portion of the reactor pressure vessel covers a plurality of instrumentation nozzles penetrating the bottom portion of the reactor pressure vessel, the instrumentation nozzles being the internal instrumentation components.

* * * * *